United States Patent
Tucker et al.

(10) Patent No.: US 12,055,265 B2
(45) Date of Patent: Aug. 6, 2024

(54) DEVICE STAND

(71) Applicant: Lenovo (Singapore) Pte. Ltd., Singapore (SG)

(72) Inventors: Matthew Tucker, Durham, NC (US); Cyan Godfrey, Chapel Hill, NC (US); Cuong Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 175 days.

(21) Appl. No.: 17/343,430

(22) Filed: Jun. 9, 2021

(65) Prior Publication Data
US 2022/0397230 A1    Dec. 15, 2022

(51) Int. Cl.
*F16M 11/12*    (2006.01)
*F16M 11/18*    (2006.01)

(52) U.S. Cl.
CPC .......... *F16M 11/123* (2013.01); *F16M 11/18* (2013.01); *F16M 2200/066* (2013.01)

(58) Field of Classification Search
CPC .... F16M 11/10; F16M 11/2014; F16M 11/24; F16M 11/123; F16M 11/18; F16M 11/02; F16M 11/04; F16M 11/041; F16M 11/043; F16M 11/16; F16M 13/02; F16M 13/022; F16M 2200/066; F21V 23/002
See application file for complete search history.

(56) References Cited

U.S. PATENT DOCUMENTS

| | | | | |
|---|---|---|---|---|
| 4,971,234 A * | 11/1990 | Hay | ........................ | B25H 5/00 414/532 |
| 6,012,591 A * | 1/2000 | Brandenberg | ............ | A47F 5/04 211/26 |
| 6,095,468 A * | 8/2000 | Chirico | .............. | F16M 11/2014 248/125.7 |
| 6,343,006 B1 * | 1/2002 | Moscovitch | ........ | B60R 11/0235 361/679.04 |
| 7,195,213 B2 * | 3/2007 | Weatherly | ............ | A47B 81/061 248/125.1 |
| 7,246,780 B2 * | 7/2007 | Oddsen, Jr. | ............ | F16M 13/02 248/125.7 |
| 7,529,083 B2 * | 5/2009 | Jeong | .................... | F16M 11/105 600/407 |
| 7,878,476 B2 * | 2/2011 | Carson | .................... | F16M 13/02 248/920 |
| 7,887,014 B2 * | 2/2011 | Lindblad | ................ | F16M 13/00 248/918 |
| 7,942,372 B2 * | 5/2011 | Koh | ....................... | A47B 97/04 248/449 |
| 8,162,271 B2 * | 4/2012 | Li | ...................... | F16M 11/2064 248/162.1 |
| 8,238,086 B2 * | 8/2012 | Ou | ........................ | F16M 11/10 361/679.21 |
| 8,462,103 B1 * | 6/2013 | Moscovitch | ........... | F16M 13/02 345/55 |
| 9,228,693 B2 * | 1/2016 | Ditges | .................... | F16M 11/24 |
| 9,549,609 B2 * | 1/2017 | Constantino | ........... | A47B 21/02 |
| 9,557,002 B2 * | 1/2017 | Wong | ................. | F16M 11/2064 |
| 10,024,053 B2 * | 7/2018 | Diekröger | ............. | A47B 57/06 |

(Continued)

*Primary Examiner* — Patrick D Hawn
(74) *Attorney, Agent, or Firm* — Brian J. Pangrle

(57) ABSTRACT

A system can include a stand that includes a base and an upright; at least one arm mountable to the upright; and serial transmission port circuitry operatively coupled to a plurality of serial transmission ports disposed along the upright.

19 Claims, 12 Drawing Sheets

(56) References Cited

U.S. PATENT DOCUMENTS

| | | | |
|---|---|---|---|
| 10,149,542 B2* | 12/2018 | Diekröger | F16M 11/42 |
| 10,208,891 B2* | 2/2019 | Myerchin | F16M 11/38 |
| 10,520,131 B2* | 12/2019 | Burke | F16M 13/022 |
| 11,044,353 B1* | 6/2021 | Goldburt | G06F 1/1686 |
| 11,543,074 B1* | 1/2023 | Sears | F16M 11/2014 |
| 2002/0027117 A1* | 3/2002 | Brandenberg | A47B 9/14 |
| | | | 211/205 |
| 2010/0019548 A1* | 1/2010 | Tajbakhsh | A47B 21/00 |
| | | | 297/162 |
| 2010/0213151 A1* | 8/2010 | Theesfeld | F16M 11/24 |
| | | | 211/151 |
| 2014/0070059 A1* | 3/2014 | Vieira | A47B 97/00 |
| | | | 248/122.1 |
| 2014/0263866 A1* | 9/2014 | Hemmer | F16M 13/027 |
| | | | 248/323 |
| 2015/0237750 A1* | 8/2015 | Yang | H05K 5/0234 |
| | | | 206/45.2 |
| 2015/0252940 A1* | 9/2015 | Goodwin | A61G 5/1094 |
| | | | 403/113 |
| 2020/0306006 A1* | 10/2020 | Bellows | F21V 21/26 |

* cited by examiner

DEVICE STAND

TECHNICAL FIELD

Subject matter disclosed herein generally relates to technology for computing systems, display systems or other systems.

BACKGROUND

Various types of systems, display systems, computing and display systems, etc. exist that include stands that occupy desktop space.

SUMMARY

A system can include a stand that includes a base and an upright; at least one arm mountable to the upright; and serial transmission port circuitry operatively coupled to a plurality of serial transmission ports disposed along the upright. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
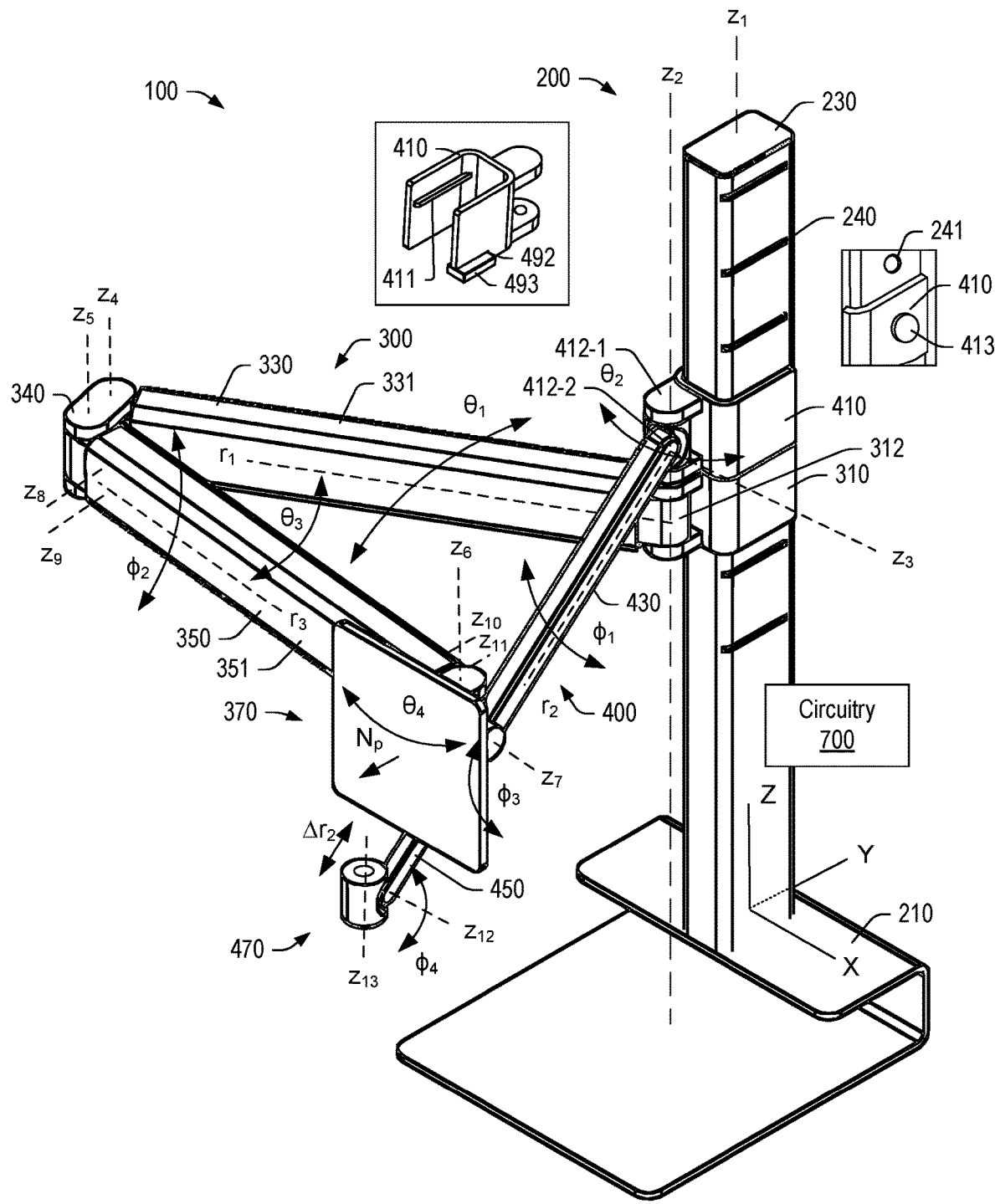
FIG. 1 is a perspective view of an example of a system.

FIG. 1 shows an example of a system 100 that includes a stand 200 that includes a base 210 and an upright 230 and at least one arm 300 and 400 mountable to the upright 230 where the system 100 can include serial transmission port circuitry 700, for example, operatively coupled to a plurality of serial transmission ports disposed along the upright 230.

In the example of FIG. 1, the system 100 can include the arm 300 as a folding arm that has a single degree of freedom stand mount assembly 310 and a plate mount assembly 370 and can include the arm 400 as a telescoping arm that has a multiple degrees of freedom stand mount assembly 410 and a socket mount assembly 470.

In the example of FIG. 1, various coordinate system parameters are shown, including a Cartesian coordinate system with axes X, Y, and X, $z_1$ as an axis of the upright 230, $z_2$ as an axis of pin joints of the mount assemblies 310 and 410, $z_3$ as an axis of another pin joint of the mount assembly 410, $z_4$ and $z_5$ as axes of a dual-axis hinge joint of the arm 300, axes $z_6$ and $z_7$ of the mount assembly 370, axes $z_8$, $z_9$, $z_{10}$ and $z_{11}$ of a four-bar linkage of a member 350 of the arm 300, and axes $z_{12}$ and $z_{13}$ of the mount assembly 470.

In the example of FIG. 1, an X, Y-plane can be substantially parallel and/or even with a surface of a desktop, a tabletop, a countertop, etc., which may be or include a workspace surface (e.g., for a mouse, a keyboard, etc.). As shown, the upright 230 can be perpendicular (e.g., normal) to the X, Y-plane and extending upwardly where the upright 230 includes various features for supporting one or more arms. As mentioned, the upright 230 can include a plurality of serial transmission ports disposed along the upright 230, which may provide for transmission of data and/or power, for example, to one or more devices operatively coupled to one or more arms supported by the upright 230. In the example of FIG. 1, a series of features for supporting an arm or arms may be spaced axially along the upright 230. For example, consider a spacing of the order of a centimeter or more (e.g., consider features space apart more than 3 cm or more). As an example, an upright may be of an axial length of approximately 15 cm or more (e.g., consider an axial length greater than approximately 20 cm, an axial length greater than 20 cm and less than approximately 150 cm, etc.). As to a cross-sectional area of an upright (e.g., in the X, Y-plane), consider an area greater than approximately 4 $cm^2$. As an example, a cross-sectional area of an upright may be less than approximately 400 $cm^2$. As an example, a cross-sectional shape may be polygonal (e.g., rectangular, etc.) and/or curved (e.g., oval, circular, etc.). As to the base 210, it may be fixed or removable from the upright 230. For example, consider a base that is formed with an upright as a unitary piece, a base that is welded to an upright, a base that is bolted or otherwise removably connected to an upright, etc. In various instances, an upright may have a threaded socket, a threaded extension, etc., that may provide for connection to a threaded extension, a threaded socket, etc. (e.g., of a desktop, a tabletop, a countertop, a pole, etc.). As an example, an upright may be telescoping. For example, consider an upright with two members where one can extend axially with respect to the other where each of the two members may include features for coupling of an arm or arms and/or a port or ports (e.g., data and/or power).

In the example of FIG. 1, the various coordinate system parameters also include $r_1$ as a radial direction of a member 330 of the arm 300 as measured from the axis $z_2$ of a pin joint of the mount assembly 310, $r_2$ as a multiple degrees of freedom radial direction of the arm 400, and $r_3$ as a radial direction of the member 350 of the arm 300 as movable via the four-bar linkage of the member 350. Various angles are also shown, including $\theta_1$ as an angle of the member 330 of the arm with respect to the axis $z_2$, $\theta_2$ as an angle of the arm 400 with respect to the axis $z_2$, $\theta_3$ as an angle between the members 330 and 350 of the arm 300, and $\theta_4$ as an angle of a plate of the plate mount assembly 370 with respect to the axis $z_6$. As illustrated, the "$\theta$" angles are in planes that can be defined as being parallel to each other where each respective "z" axis is normal to the corresponding plane. For example, consider cylindrical coordinate systems associated with each of the "z" axes where the "θ" angles can be azimuthal coordinate angles. Other angles in the example of FIG. 1 are "ϕ" angles, which include $\phi_1$ as an altitudinal angle of the arm 400, as an altitudinal angle of the member 350, $\phi_2$ as an altitudinal angle of the mount assembly 370 and $\phi_3$ as an altitudinal angle of the mount assembly 470.

In the example of FIG. 1, the arm 300 can include one or more covers 331 and 351. For example, consider the cover 331 as being a cover for a bar or bars of the member 330 and the cover 351 as being a cover for a bar or bars of the member 350. As an example, a cover may include one or more cable guide features and/or may form a cable guide (e.g., a cable channel, etc.).

In the example of FIG. 1, the arm 400, as mentioned, can be telescoping. For example, the arm 400 can include a first member 430 and a second member 450 where the second member 450 can be translatable with respect to the first member 430. For example, consider a dimension $\Delta r_2$ as indicating a translatable direction and dimension of the second member 450. As shown, the first member 430 is coupled to the mount assembly 410, noting that the arm 400 may include more than two members that can provide for translatable adjustment.

In the example of FIG. 1, the upright 230 is perpendicular to at least a portion of the base 210. In the example of FIG. 1, the base 210 may be suitable for attachment to a plank such as a tabletop, a desktop, a countertop, etc. As an example, the stand 200 may include another type of base, which may be selected from one or more types of bases. For example, consider a base with a threaded socket where a bolt may be threaded into the threaded socket to clamp the upright 230 to a tabletop, a desktop, a countertop, etc.

In the example of FIG. 1, the upright 230 is shown as including various features, which can be disposed along the axial direction of the upright 230. For example, consider a slot 240 as a feature that can be utilized to couple a mount assembly to the upright 230 where the upright 230 can include a plurality of such slots. In such an example, an axial height of an arm may be determined upon selection of one of the plurality of slots to couple a mount assembly of the arm to the upright 230. In the example of FIG. 1, the slot 240 is shown as extending along the Y direction, noting that a slot may be angled (e.g., sloping downwardly from front to back). As an example, the upright 230 may include openings, which may be shaped as slots or circles or another suitable shape to receive a corresponding feature of an arm. For example, FIG. 1 shows a back perspective view of at least a portion of the mount assembly 410 with a feature 411 that can be received in a slot such as the slot 240, along with a port opening 492 with a plug 493 (e.g., a cable plug) where the port opening 492 can allow the plug 493 to be fit to a port of the upright 230. FIG. 1 also shows an example of an alternative or additional features such as an opening 241 and a peg 413 where the peg 413 can be received at least in part by the opening 241 to connect the mount assembly 410 to the upright 230. While various features are shown with respect to the mount assembly 410, one or more of such features may be included as part of the mount assembly 310.

In the example of FIG. 1, the arm 300 is shown as being substantially larger than the arm 400. For example, the arm 300 may be for carrying heavier equipment than the arm 400. As an example, to maintain a lower center of gravity of an arm as mounted to the upright 230, the arm 300 may be mounted at a lower axial position than the arm 400. For example, if the arm 300 were mounted at an axial position of the slot 240, there may be increased torque at the junction between the upright 230 and the base 210 compared to the axial position of the arm 300 as shown.

As shown in the example of FIG. 1, the mount assembly 310 can be a single degree of freedom stand mount assembly that includes a pin joint 312 where such a pin joint can include an axle (e.g., a pin) disposed at least in part in a bushing. The mount assembly 310 in FIG. 1 allows for one degree of freedom of movement of the member 330 in a plane (e.g., a plane defined by $r_1$ and $\theta_1$). As mentioned, the member 350 can include a four-bar linkage that provides an additional degree of freedom (e.g., in a plane defined by $r_3$ and $\phi_3$). Further, one or more degrees of freedom may be provided via the mount assembly 370, which can be defined in part via a normal $N_p$, for example, a normal vector of a plate portion of the mount assembly 370. In such an example, the plate portion may be suitable for mounting of a display, which may be an "all-in-one" (AIO) computer where the normal $N_P$ may correspond to a normal of a surface of the display. As an example, the arm 300 may be utilized for mounting of a display where various features of the arm 300, as mounted to the upright 230, provide for adjusting the display (e.g., up/down, left/right, tilt back/front, tilt side/side, etc.).

As shown in the example of FIG. 1, the mount assembly 410 can be a multiple degrees of freedom stand mount assembly that includes multiple pin joints 412-1 and 412-2. In such an example, each of the multiple pin joints 412-1 and 412-2 can include an axle disposed at least in part in a bushing. As an example, the mount assembly 410 may include a ball joint. For example, consider a ball joint that includes at least a portion of a ball and at least a portion of a ball socket. In such an example, the ball joint may provide for various degrees of freedom of movement of the member 430.

Referring again to the mount assembly 370, it may include openings where the openings form at least one standard mount pattern (e.g., VESA, etc.). As to the mount assembly 470, it may be a socket mount assembly that includes threads and/or a quick release mechanism that includes the threads. For example, consider various types of "tripod" mounts that are utilized for cameras, lighting, microphones, etc. Various types of mounts can include standardized threads, quick-release mechanisms, clamps, etc.

As mentioned, an arm can include at least one member that includes a four-bar linkage. For example, the arm 300 can be a folding arm that includes the two members 330 and 350, where the member 330 can include the stand mount assembly 310 and where the member 350 can include the four-bar linkage and the plate mount assembly 370. As mentioned, the arm 300 (e.g., or the arm 400) can include a joint disposed between two members. For example, a dual-axis hinge 340 can be such a joint (see, e.g., the axes $z_4$ and $z_5$). As an example, a dual-axis hinge can be a type of dual pin joint where, for example, the axes are parallel.

As mentioned, the arm 400 can be a telescoping arm that includes at least two members such as the members 430 and 450. In such an example, the member 430 can include the multiple degrees of freedom stand mount 410 and another member (e.g., the member 450, etc.) can include the socket mount assembly 470.

As explained, the stand 200 can include a series of axially stacked arm couplings where, for example, the series of axially stacked arm couplings include at least two arm couplings, at least three arm couplings, or at least four arm couplings.

In the example of FIG. 1, the system 100 may be suitable for including a display coupled to the plate mount assembly 370 and a media capture device coupled to the socket mount assembly 470.

As an example, the system 100 can include at least two of the folding arms 300 and/or at least two of the telescoping arms 400. Consider a system with two of the folding arms 300 coupled to the stand 200 and to two displays and at least one media capture device coupled to the telescoping arm 400.

As explained, the stand 200 can include the upright 230 where the upright 230 defines an axis and where a single degree of freedom of the single degree of freedom mount assembly 310 is orthogonal to the axis. As explained, the stand 200 can include the upright 230 where the upright 230 defines an axis and where one of the degrees of freedom of the multiple degrees of freedom mount assembly 410 is parallel to the axis.

In the example of FIG. 1, the circuitry 700 can be operatively coupled to various ports. For example, consider the stand 200 as including serial transmission ports that transmit at least one of data and power. As an example, such ports may be universal serial bus ports (e.g., USB ports), which may comport with one or more USB standards (e.g., USB Type A, USB Type B, USB Type C, etc.). As an example, the circuitry 700 can be or can include a hub such as a USB hub.

Figure 2:
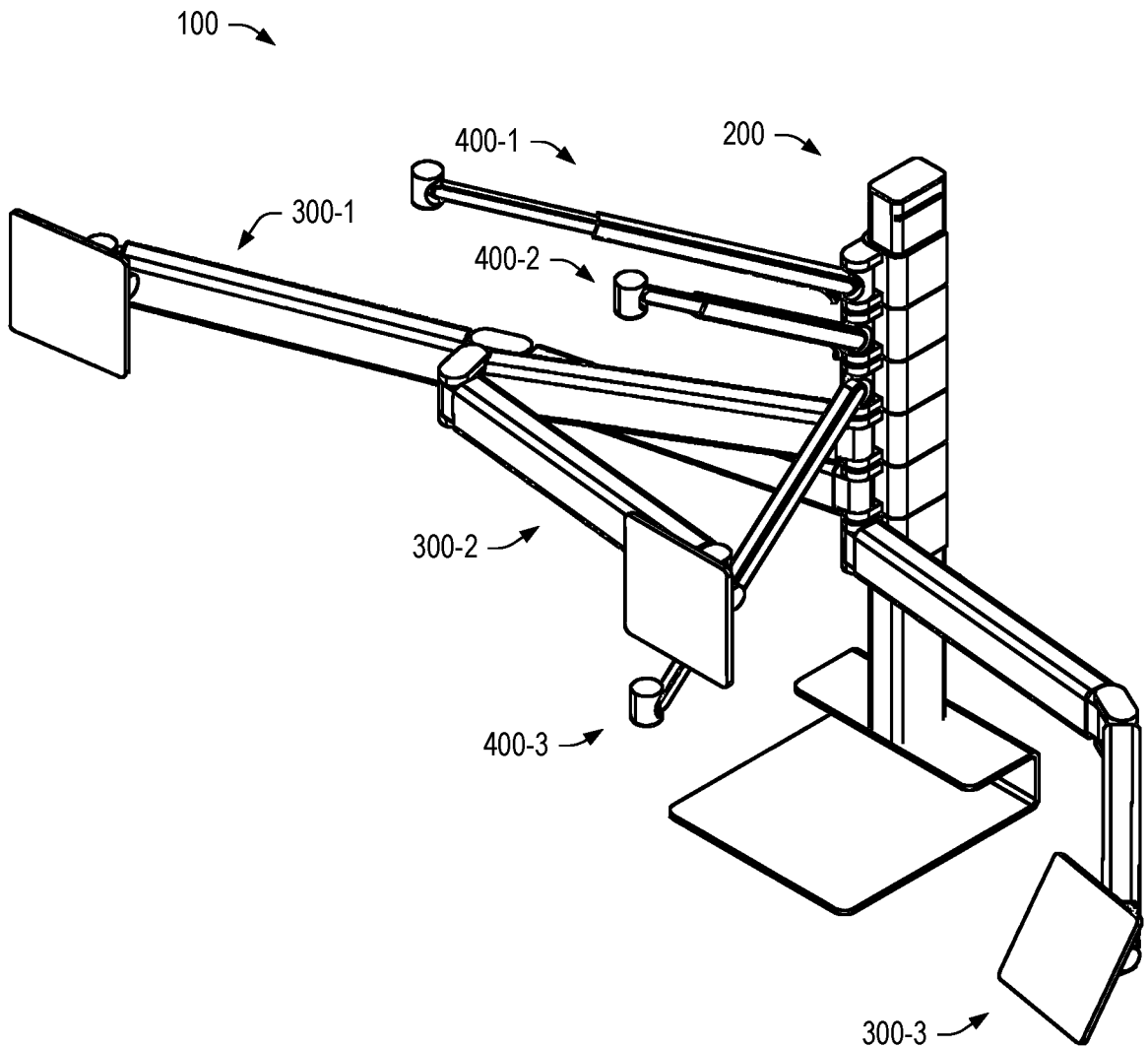
FIG. 2 is a perspective view of an example of a system.

FIG. 2 shows an example of the system 100 with three of the arms 300, labeled 300-1, 300-2 and 300-3, and three of the arms 400, labeled 400-1, 400-2 and 400-3. As shown, the stand 200 can support at least six arms, which can support at least six devices. Where such devices include ports, the system 100 can include the circuitry 700 where the circuitry 700 may be electronically coupled to the ports of one or more of the devices. In such an example, the circuitry 700 may provide for transmission of power and/or data between at least two devices.

Figure 3:
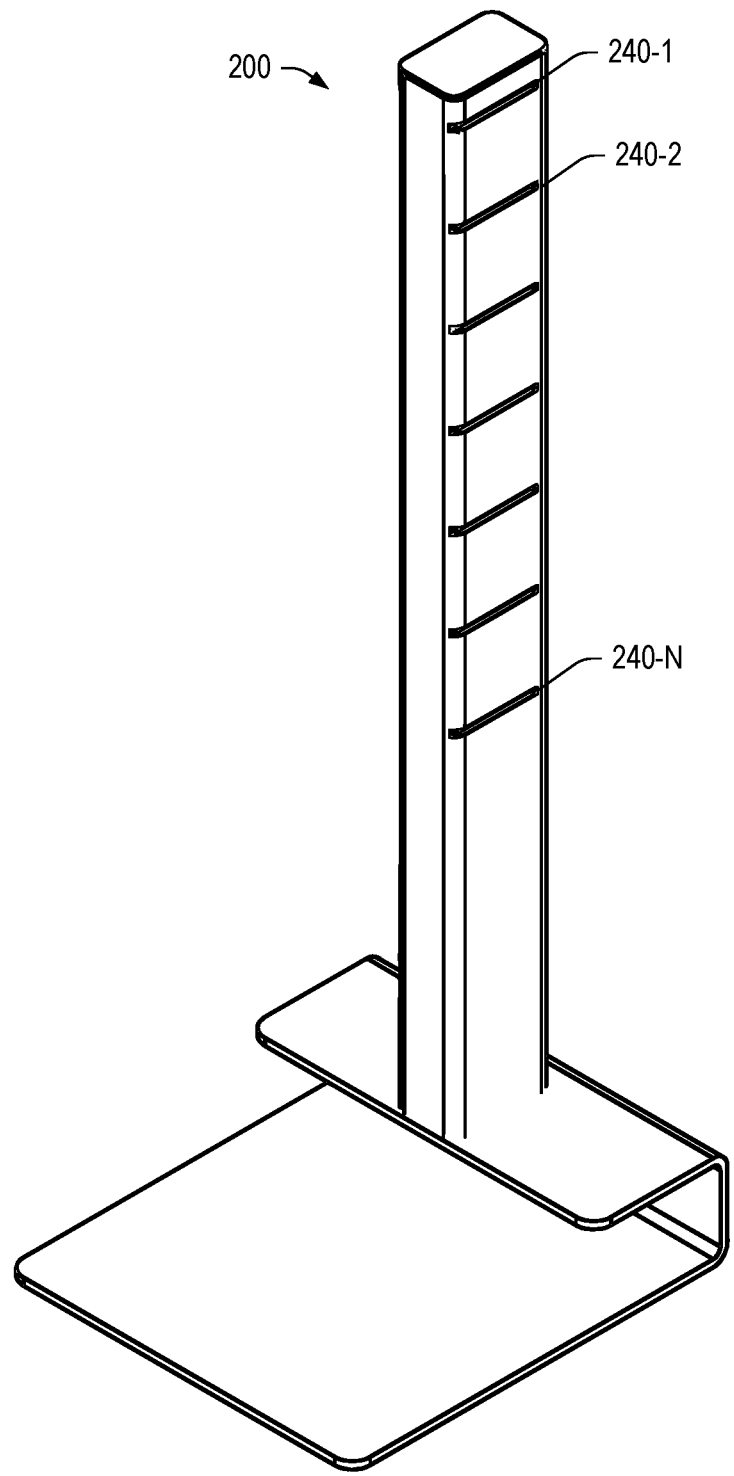
FIG. 3 is a perspective view of an example of a stand.

FIG. 3 shows a perspective view of the stand 200, along with a series of features such as the feature 240, labeled 240-1, 240-2 to 240-N.

Figure 4:
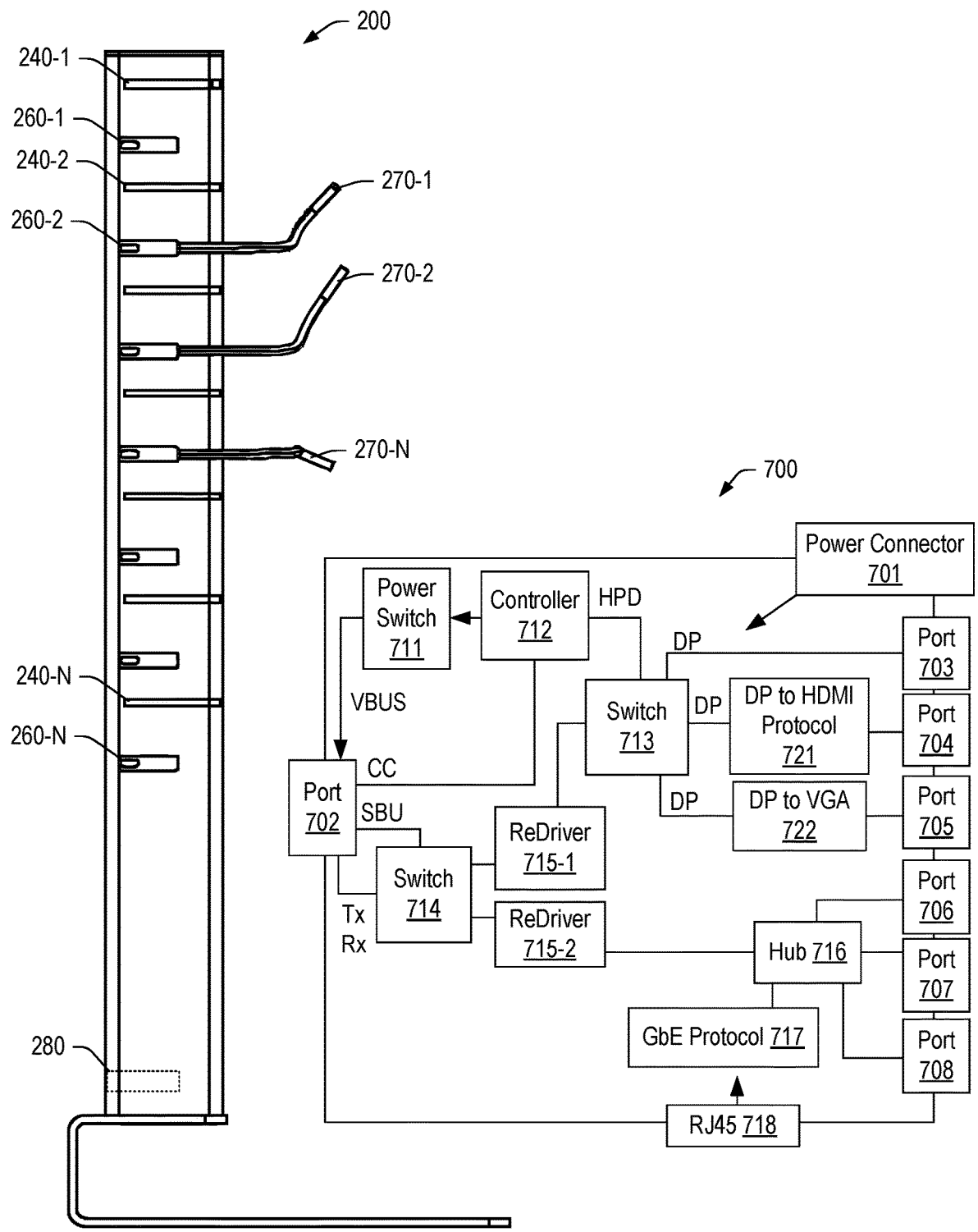
FIG. 4 is a side view of an example of a stand and a diagram of an example of circuitry.

FIG. 4 shows a side view of the stand 200 and an example of the circuitry 700 where a series of ports 260-1, 260-2 to 260-N are shown with respect to the stand 200 where, for example, there can be a one-to-one correspondence of ports to the features 240-1, 240-2 to 240-N for coupling a stand mount. FIG. 4 also shows portions of cables 270-1, 270-2 and 270-N, which may be coupled to respective ports and to respective devices, which may be carried by one or more arms mounted to the stand 200. As indicated in the views of FIG. 3 and FIG. 4, the features 240-1, 240-2 to 240-N can be substantially symmetric such as opposing slots where a stand mount assembly can include extensions that can be received at least in part by a set of slots. For example, consider a translational movement that causes extensions of a stand mount assembly to be received in a set of slots to thereby couple the stand mount assembly to the stand. As an example, the stand may include extensions and/or slots and a stand mount assembly may include slots and/or extensions where features cooperate for mounting.

In the example of FIG. 4, the circuitry 700 includes a power connector 701, ports 702, 703, 704, 705, 706, 707 and 708, a power switch 711, a controller 712, a switch 713, a switch 714, redrivers 715-1 and 715-2, a hub 716, a gigabit Ethernet (GbE) protocol converter 717, a RJ45 port 718, a DisplayPort (DP) to HDMI protocol converter 721, and a DP to VGA converter 722. In the example of FIG. 4, the port 702 may be a USB port (e.g., Type C), the port 703 may be a DP port, the port 704 may be a HDMI port, the port 705 may be a VGA port and the ports 706, 707 and 708 may be USB ports; noting that fewer or lesser ports may be included of same, similar and/or different types. As an example, a majority of the ports may be USB ports, which may be or include USB Type C ports.

In the example of FIG. 4, the circuitry 700 can be docking station circuitry where, for example, a computer may be coupled via a cable to the port 702 where the circuitry 700 can control transmissions (e.g., including receptions) with one or more of the other ports 703 to 708, etc. For example, consider one cable that runs to a port of the stand from a computer (e.g., a laptop, an AIO, a desktop, etc.) where various other ports can be utilized for making electronic connections with the computer. As to an electronic connection, it may include an optical connection such as via an optical cable where electromagnetic energy can be utilized for transmission of data.

As shown, the circuitry 700 can include a power connector 701 where an AC adapter or other power supply may be connected. In such an example, the stand 200 may include the power connector 701 (see, e.g., a connector 280) and/or may include an AC adapter (e.g., AC to DC conversion circuitry, etc.), which may be part of the circuitry 700. As an example, the system 100 may include one or more rechargeable batteries that may be suitable for use without a connection to an external power supply (e.g., a wall outlet, etc.) and/or for emergency use during a power outage. For example, the system 100 can include an uninterruptible power supply (UPS). A UPS can be an on-line UPS that utilizes a "double conversion" technique of accepting AC input, rectifying to DC for passing through a rechargeable battery (or battery strings), then inverting back to 120 V/230 V AC for powering equipment; a line-interactive UPS that maintains an inverter in line and redirects a battery's DC current path from a normal charging mode to supplying current when power is lost; and/or a standby (e.g., off-line) system where load is powered directly by input power and backup power circuitry is invoked when utility power fails. As an example, the stand 200 may provide for charging one or more batteries of one or more devices via the circuitry 700.

As to USB specifications, USB 3.0 is known as SuperSpeed (SS) with data rates of 5 Gbps (e.g., consider USB 3.1 Gen 1, Gen 2, etc., which can provide data rates in excess of 5 Gbps). As to power, SuperSpeed devices may be rated at 0.75 W (low-power) and 4.5 W (high-power). USB can be used to charge batteries, by delivering up to 25 W from a charger, a host device with a dedicated charging port (DCP) or a charging downstream port (CDP), the latter of which also provides a data signal. The 2012 specification for USB Power Delivery (PD) provides compatible downstream devices to request greater supply voltage and current from compatible host equipment (e.g., up to 10 W at 5 V, increasing to 36 W/60 W at 12 V and 60 W/100 W at 24 V). USB can utilize both active and passive cables.

USB Type C includes 24 contacts or wires and can be plugged in either of two different orientations. USB Type C includes various operating modes (e.g., Alternate Mode, Accessory Mode, etc.). As to power, as mentioned, SuperSpeed had a maximum of 4.5 W. In contrast, Type C can provide 15 W over a VBUS connection (e.g., via currents of 1.5 A and 3 A at 5 V). USB Type C supports the Power Delivery 2.0 specification. As indicated by "CC" in the circuitry 700, power can be transmitted (e.g., CC1 or CC2) to power an external device, an active cable or an electronically marked cable.

As to operation, when a cable is connected or energized, selected signal drivers, receivers and switches/multiplexers can be implemented; noting that various multiplexers, receivers and drivers that were created for USB 3.1 in USB Type C may be suitable for various operations.

In the circuitry 700, the switch 713 may be disposed electronically between a host device's I/O hub (e.g., a crossbar switch such as the PERICOM/Diodes Incorporated P13USB31532 chip), which enables switching of USB 3.1 Gen 1, Gen 2 and DisplayPort 1.2 and 1.3 through a USB Type C port. Such circuitry can be linked to a redriver 715-2 (e.g., PERICOM/Diodes Incorporated P13EQX1002B ReDriver chip), for example, to optimize performance. In the example of FIG. 4, various components may provide for a variety of charging and control solutions for both a host side and a device(s) side, which may include over-temperature and over-voltage protection and charging capability (e.g., 100 W through Type C plugs).

For a smartphone connection, a PERICOM/Diodes Incorporated P15USB30213A switch chip may be utilized to link a Type C port with a main chipset. Such an approach allows the smartphone to function as a host, peripheral and in a dual-role mode. Configuration may be automatic, for example, based on the voltage detected on a CC contact.

As mentioned, the circuitry 700 may be operable as docking station circuitry to make the stand 200 a docking station. For example, consider an approach that provides for an upstream host via the port 702. Such an approach can provide for carrying USB 3.X and DisplayPort (DP) signals, as well as power to the host. On the USB side, a PERICOM/Diodes Incorporated P13USB31532 Type C crossbar switch chip, a PERICOM/Diodes Incorporated P13EQX1002B ReDriver chip and a USB 3.X hub can be utilized. As an example, the power switch 711 can enable such a dock to deliver power to a host through a VBUS.

In the example of FIG. 4, the number of ports of the circuitry 700 can match a number of connection bays of the stand 200 such that each arm can include a corresponding port for transmission and/or reception of data and/or power. As an example, the ports 260-1 to 260-N can be ports electrically coupled to circuitry that can include one or more features of the example circuitry 700 of FIG. 4.

As explained, USB types of technology are trending toward more power, as are various power over Ethernet technologies (PoE). As an example, the system 100 can include one or more types of power circuitry where, for example, power may be supplied to one or more devices via one or more ports (e.g., connectors) disposed on the upright 230 of the stand 200 (e.g., via USB, PoE, etc.). As to PoE devices, consider, as an example, a PoE camera.

As to RJ45 and/or Ethernet, an 8P8C standard may be utilized for one or more types of applications (e.g., computer networking, etc.). For example, a plug can be an 8P8C modular plug wired according to a TIA/EIA standard (e.g., consider Category 5e or Category 6 cable with an 8P8C modular plug crimped on each end). As an example, an 8P8C modular connector may be utilized for RS-232 serial interfaces (e.g., consider the EIA/TIA-561 standard, etc.). Such an approach may be suitable for a console interface on network equipment such as switches and routers. Other applications may include other networking services such as ISDN and T1.

As an example, a system such as the system 100 can include networking circuitry, which may be suitable for one or more types of networking. As an example, networking or network circuitry can include circuitry for wired and/or wireless networking.

Figure 5:
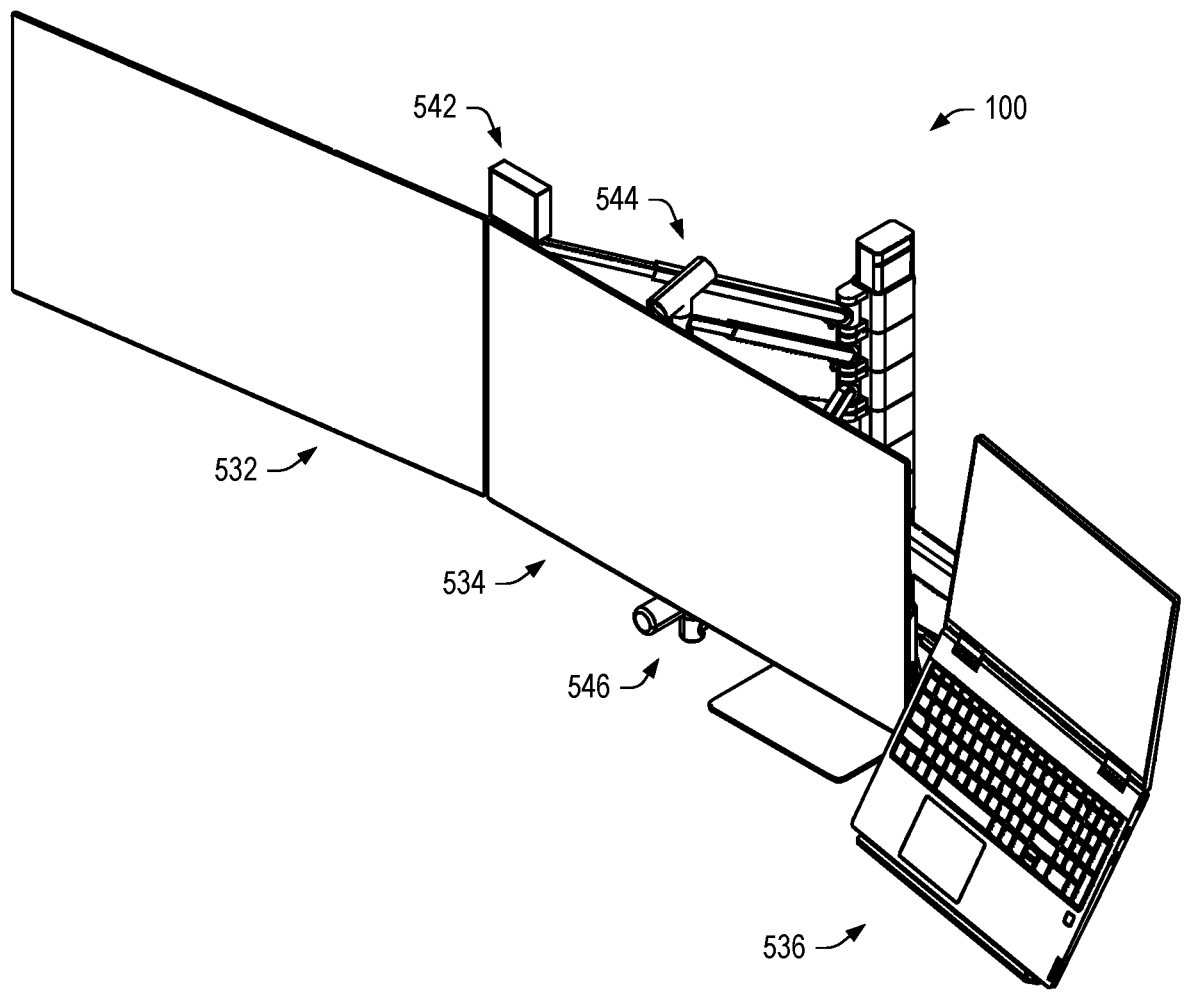
FIG. 5 is a perspective view of an example of a system.

FIG. 5 shows a front side perspective view of an example of the system 100 with six arms and six devices 532, 534, 536, 542, 544 and 546. In the example of FIG. 5, the devices 532 and 534 are displays, the device 536 is a laptop computer mounted on a holder, the device 542 is an illumination device (e.g., a light), the device 544 is a camera (e.g., a webcam, etc.), and the device 546 is a microphone. As an example, the system 100 can include the circuitry 700 where the circuitry can power and/or transmit data. As an example, the circuitry 700 may provide for transmission of video data from the device 536 to at least one of the devices 532 and 534. As an example, the circuitry 700 may provide for transmission of video data from the device 544 to the device 536 and provide for transmission of audio data from the device 546 to the device 536. As an example, the device 542 may be operatively coupled to circuitry for automatic adjustment as to exposure, etc., for the device 544. As an example, the system 100 may be suitable for videoconferencing.

As shown in the example of FIG. 5, the arms 400-1, 400-2 and 400-3 (see, e.g., FIG. 2) provide for positioning of the devices 542, 544 and 546 with respect to the devices 532 and 534. In particular, each of the arms 400-1, 400-2 and 400-3 can be positioned via at least respective stand mount assemblies and telescopic features to reach above or below one or both of the devices 532 and 534. As shown, the device 546 can be a microphone that may be positioned at a lower level than the device 544, which can be a camera. In such an arrangement, these two media capture devices can be appropriately positioned given the area occupied by the device 534, which is shown as being a planar display. Such an approach may be suitable for videoconferencing where, for example, other information may be rendered and visible to a user via the device 532 and/or the device 536. As an example, the device 536 may be a command or control device that can control operation of the other devices 532, 534, 542, 544 and 546.

Figure 6:
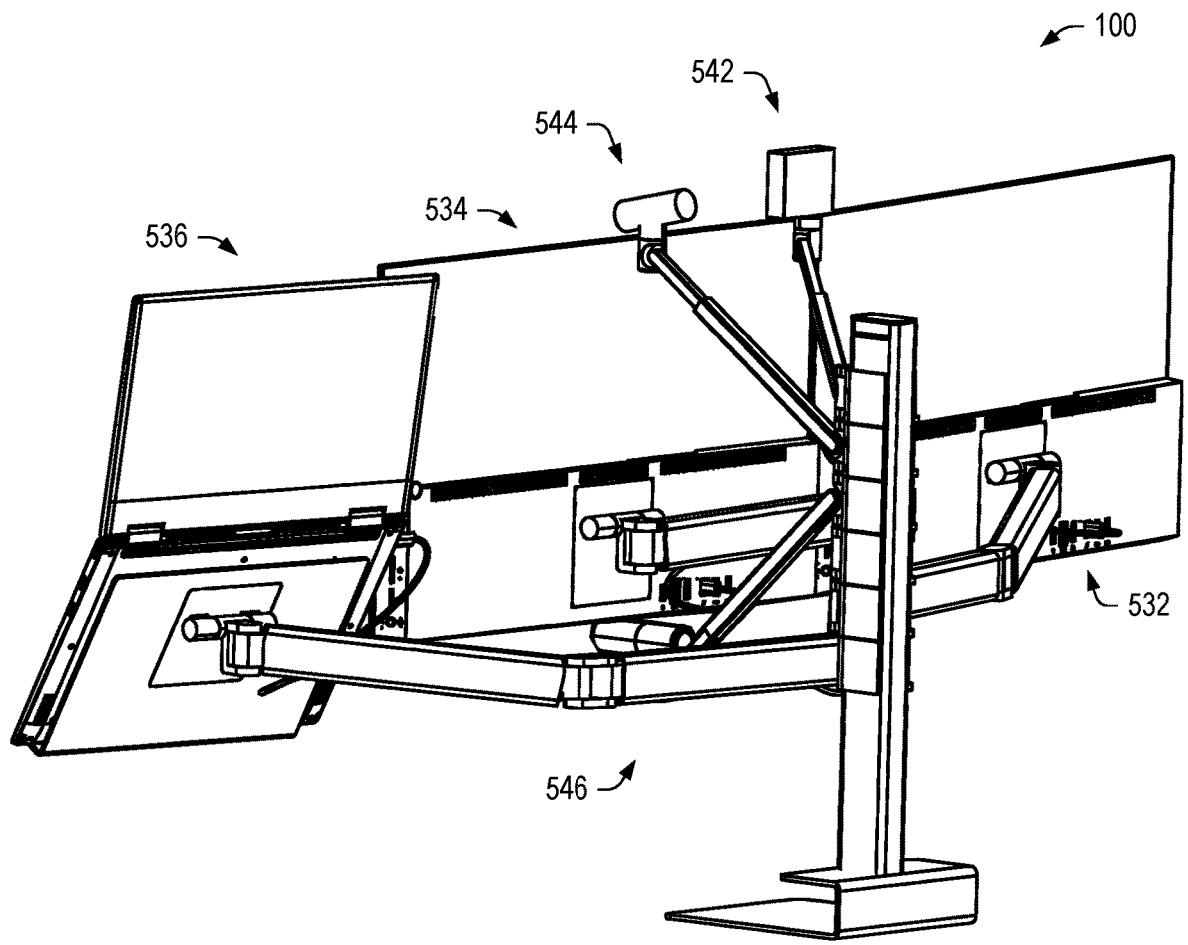
FIG. 6 is another perspective view of the system of FIG. 5.

FIG. 6 shows a back side perspective view of the example system 100 of FIG. 5. In the example of FIG. 6, various ports are shown on the devices 532, 534 and 536 where cables may extend from such ports to the ports 260-1 to 260-N, as appropriate. Such an approach provides for a relatively clean and uncluttered workspace. As an example, a cable may run at least in part within and/or along an arm. As mentioned, an arm may include a cover that defines an internal channel for one or more cables and/or an arm may include a cable clip, a cable loop, etc., to provide for cable management (e.g., positioning, etc.).

In the example of FIG. 6, the device 536 may be a host device where a cable extends from the device 536 to the stand 200 to connect to one of the ports 260-1 to 260-N of the stand 200. In such an example, the stand 200 can include the circuitry 700, which can operate at least in part as a hub (e.g., including at least hub circuitry). In such an example, the device 536 may control rendering of visual information on displays of the devices 532 and 534, along with, for example, interactions with one or more accessory devices (e.g., one or more of the devices 542, 544 and 546). As mentioned, the system 100 may operate as a videoconferencing station.

As shown in FIG. 6, the equipment mounted to the stand 200 can be elevated to be above a surface such as a tabletop, a desktop, a countertop, etc. As an example, the stand 200 may be a pole and/or pole mounted (e.g., consider a kiosk, etc.).

As mentioned with respect to FIG. 1, various joints of the arms 300 and 400 allow for movement of the arms 300 and 400 such that one or more devices may be appropriately positioned where, for example, there may be different classes of devices. For example, consider a heavy weight class and a light weight class where the heavy weight class is for devices with a mass greater than approximately 0.5 kg (e.g., greater than approximately 1 lb). As an example, classes may be dependent on mounting type. For example, planar devices such as displays may be suitable for mounting using a plate type of mount (e.g., VESA, etc.); whereas, some media capture types of devices and/or associated devices (e.g., lighting, etc.) may be suitable for mounting using a socket type of mount (e.g., a "tripod" type of mount, whether male and/or female).

Figure 7:
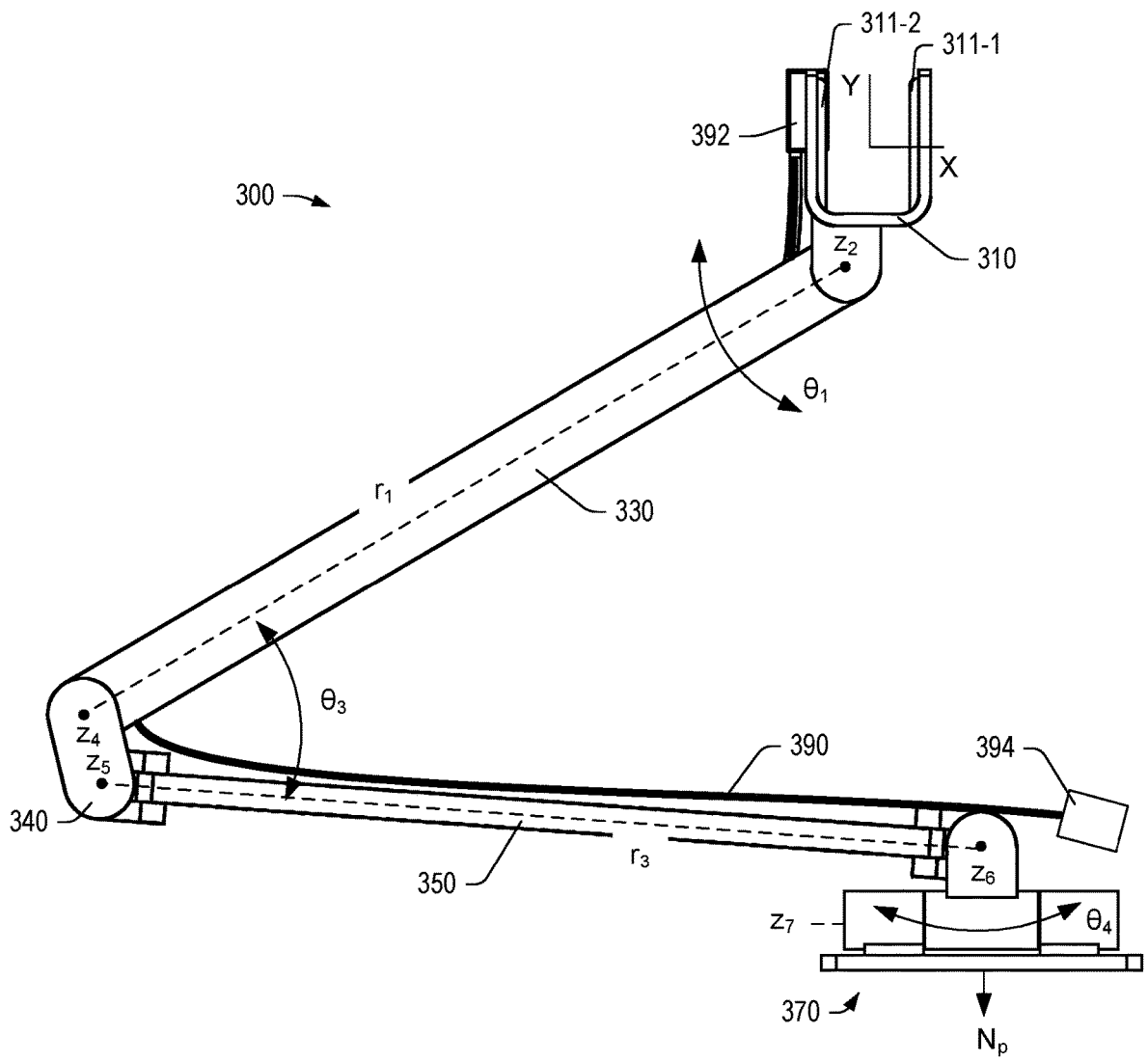
FIG. 7 is a plan view of an example of an arm.

FIG. 7 shows an example of the arm 300 with the cover 351 removed from the member 350. As shown, a cable 390 can be run along the arm 300 where the cable 390 includes plugs 392 and 394 at opposing ends. As shown in FIG. 7, the mount assembly 310 can include features 311-1 and 311-2 that can be received in openings of the upright 230. For example, consider a pair of slots that can receive the features 311-1 and 311-2 to secure the mount assembly 310 to the upright 230 at a desired axial position. In such an example, the desired axial position may be defined with respect to the Z axis as shown in FIG. 1 where the member 330 moves in a plane parallel to the X, Y-plane at the respective axial position along the Z axis. In the example of FIG. 7, the member 330 may be movable in a range of approximately 180 degrees such that the mount assembly 370 may be folded back toward the upright 230. As an example, the member 350 may be movable in a range of approximately 180 degrees or more with respect to the member 330. As an example, the members 330 and 350 may be folded to be approximately parallel to each other. As an example, the members 330 and 350 may be approximately the same length (e.g., the member 350 may be of a length that is plus or minus 20 percent of the length of the member 330).

Figure 8:
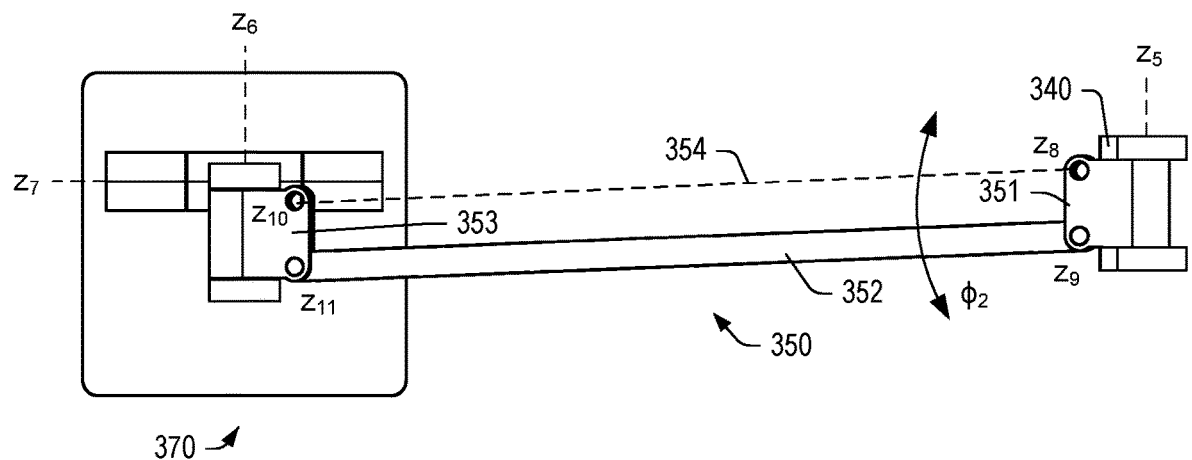
FIG. 8 is a side view of an example of a portion of an arm.

FIG. 8 shows an example of the member 350 without the cover 351 and with the mount assembly 370 and a portion of the dual-axis hinge 340. As shown, the member 350 includes four openings or bore as represented by the axes $z_8$, $z_9$, $z_{10}$ and $z_{11}$. The four "bars" are labeled 351, 352, 353 and 354 (see dashed line). In such an example, the mount assembly 370 can be raised upwardly and lowered downwardly via the four-bar linkage. In such an example, the "bars" define a plane where the movement upward and downward is within the plane. To help to prevent pinching of an object by or between the bars 352 and 354, the member 350 can include the cover 351 (e.g., as a plastic cover, a metal cover, etc.). As mentioned, the cover 351 may be utilized to form a channel for running a cable.

Figure 9:
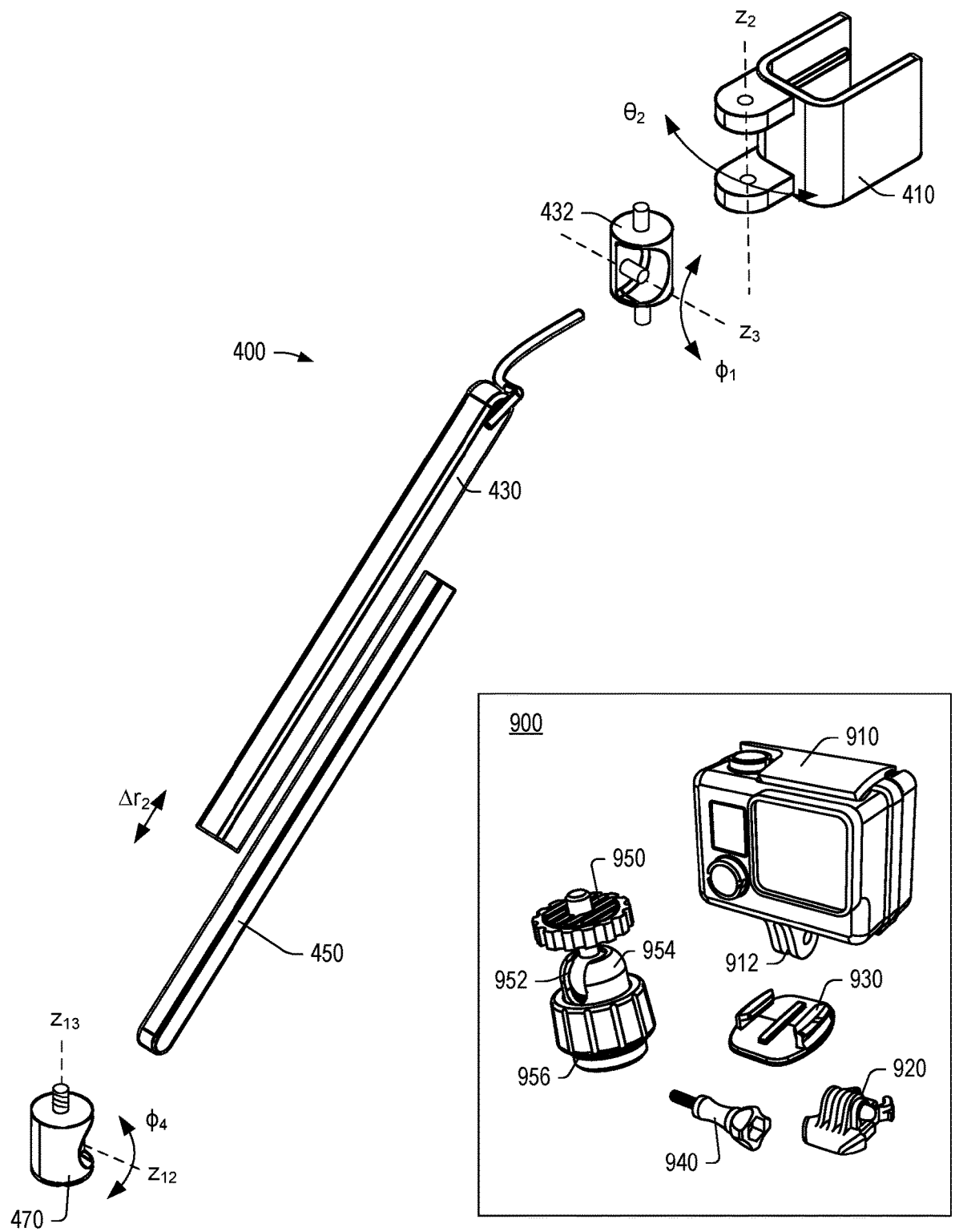
FIG. 9 is an exploded perspective view of an example of an arm and examples of components.

FIG. 9 shows an example of the arm 400 in an exploded view where various features can be seen. For example, consider a multiple pin coupling 432 that can include pins for receipt of bores of the stand mount assembly 410 and receipt of a bore of the member 430 of the arm 400. As mentioned, the arm 400 may include a ball joint. For example, the member 430, the coupling 432 and/or the stand mount assembly 410 may include one or more ball joint features. As an example, the member 450 and/or the socket mount assembly 470 may include one or more ball joint features.

As an example, the member 450 may be received via a channel of the member 430 to provide for telescoping where one or more of rails, guides, etc., may be utilized for translation (e.g., extension or contraction). As an example, the member 450 may be fit into the member 430 using an interference fit where a suitable amount of friction exists such that the member 450 is held firmly in a desired position by the member 430. In various examples, friction joints may be utilized where friction can be utilized to maintain a position of a device coupled to an arm such as the arm 400. As mentioned, the arm 400 may be a "lightweight" device arm when compared to the arm 300. As to the arm 300, suitable friction may be achieved via a four-bar linkage where friction can exist at each of four axes (e.g., pins in bores) such that a display or display device can be coupled to the arm 300 and supported in a desired position without movement (e.g., creep, etc.) under the influence of gravity.

In the example of FIG. 9, the socket mount assembly 470 is shown as including a threaded extension and a recess that can include a pin such as the coupling 432. In such an example, the member 450 can include a bore that can receive the pin. As an example, the threaded extension may be a standardized type of extension such as a "tripod" type of extension, a GOPRO camera and/or accessory type of extension, etc. For example, consider an example of a system 900 with various examples of components that may include a camera 910 with a mount component 912, a mount component 920 that can be received in part by the mount component 912, a mount component 930 that may be a base (e.g., quick release base) for the mount component 920 and a mount component 940 that may be utilized to secure the mount components 912 and 920 to one another (e.g., a bolt or pin that can be received by bores of the mount components 912 and 930). Also shown in FIG. 9 is a ball joint assembly 950 that includes a ball 952, a ball socket 954 and a base 956. As explained, a ball joint may provide for multiple degrees of freedom of movement, for example, compared to a single pin joint. As explained, the coupling 432 and/or the mount assembly 410 may include features of a ball joint.

As an example, the mount assembly 470 may include one or more features of the system 900. For example, the mount component 920, the mount component 930 and/or the ball joint assembly 950 may be fit to (e.g., using a threaded bore, etc.) or otherwise part of the mount assembly 470. In such an example, the camera 910 or another device may be coupled to the mount assembly 470.

As an example, the arm 400 may include one or more cable guide features. For example, consider one or more of the members 430 and 450 being hollow or otherwise as including a channel where a cable can run in one or more of the members 430 and 450. One or more of the members 430 and 450 may include one or more openings for receipt of at least a portion of a cable, where, for example, the one or more openings can accommodate a cable with a plug or plugs. As an example, one or more of the member 430 and 450 may include a cable clip, a strap, etc., to facilitate positioning of a cable.

Figure 10:
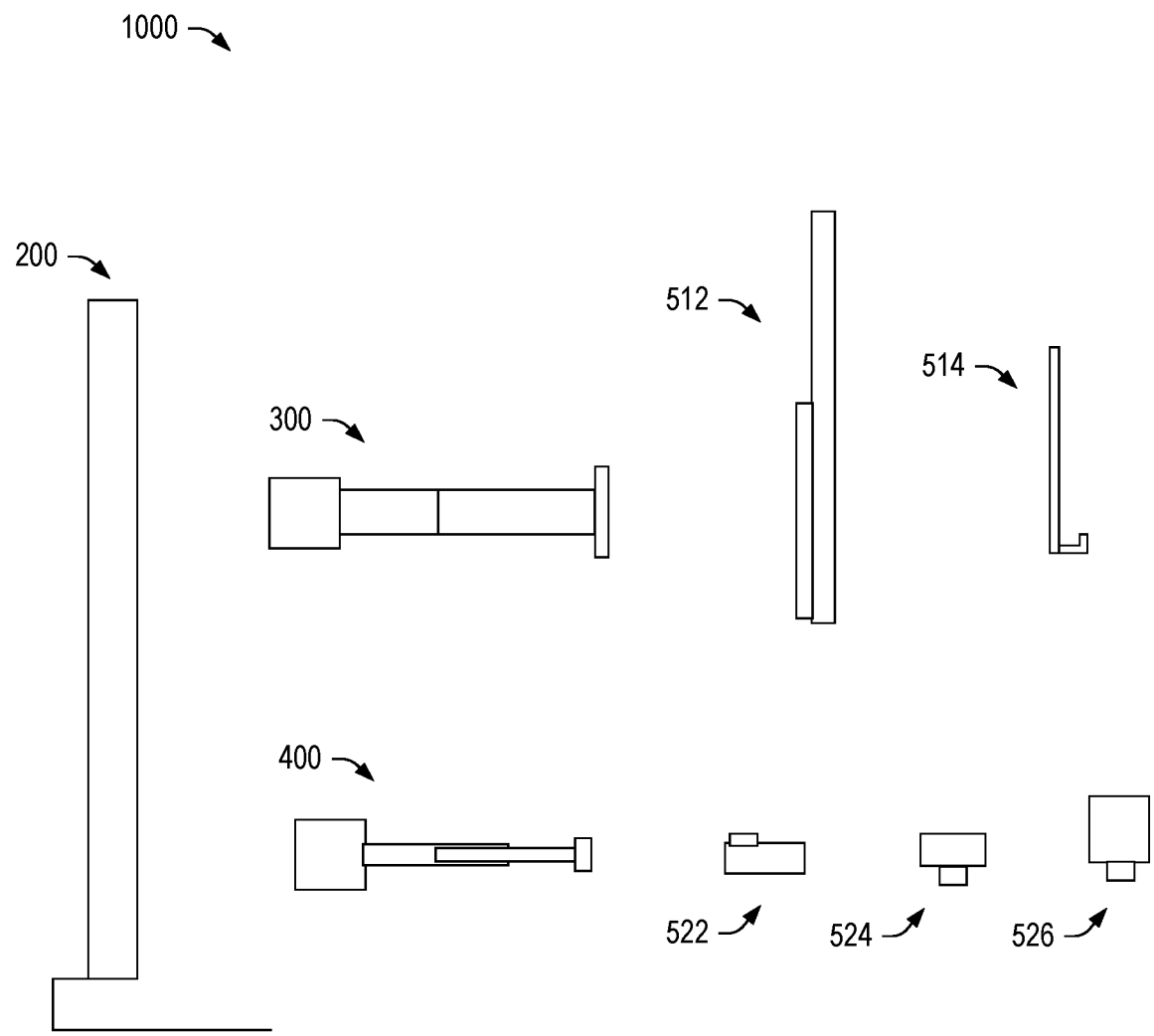
FIG. 10 is a side view of example components of an example of a kit.

FIG. 10 shows various examples of components of a kit 1000. For example, consider the kit 1000 as including the stand 200 and at least one arm 300 and 400 where the kit 1000 can be enlarged to include one or more of a display 512 (e.g., or an AIO device), a laptop holder 514, a microphone 522, a camera 526 and an illumination device 526 (e.g., a beauty light, a light panel, etc.). As shown in the example of FIGS. 5 and 6, the system 100 may be a kit that includes three of the arms 300 and three of the arms 400 along with the devices 532, 534, 536, 542, 544 and 546, which may collectively form a videoconferencing station (e.g., a multiple display device videoconferencing station). As an example, an accessory device may be a device other than a microphone, a camera or an illumination device. For example, consider a smartphone holder, a speaker (e.g., wired and/or wireless), a watch holder, a wireless charging station, a memory card device, a biometric reader (e.g., fingerprint, eye, etc.), an electronic sketch pad, a touchpad, a digitizer tablet, a divider/privacy panel, a voice recorder, a rechargeable battery, one or more solar cells, a port, etc. As to an example of a solar cell or solar cell array, consider a system that may be utilized outdoors where an arm can be positioned to have a solar cell or solar cell array appropriately oriented with respect to the sun. In such an example, one or more devices operatively coupled to the system may be powered at least in part, directly and/or indirectly (e.g., via battery), via solar power. As to an example of a port, consider a port that can be a serial transmission port for data and/or power that can be operatively coupled to circuitry such as the circuitry 700 that may be carried by the stand 100. In such an example, a user may position the port via an instance of an arm (e.g., the arm 400, etc.) that extends from the stand 100. In such an example, a port may be positioned in front of a plane of a display device that may be mounted to another arm (e.g., such that a user does not have to reach behind the screen to make a connection to the port).

Figure 11:
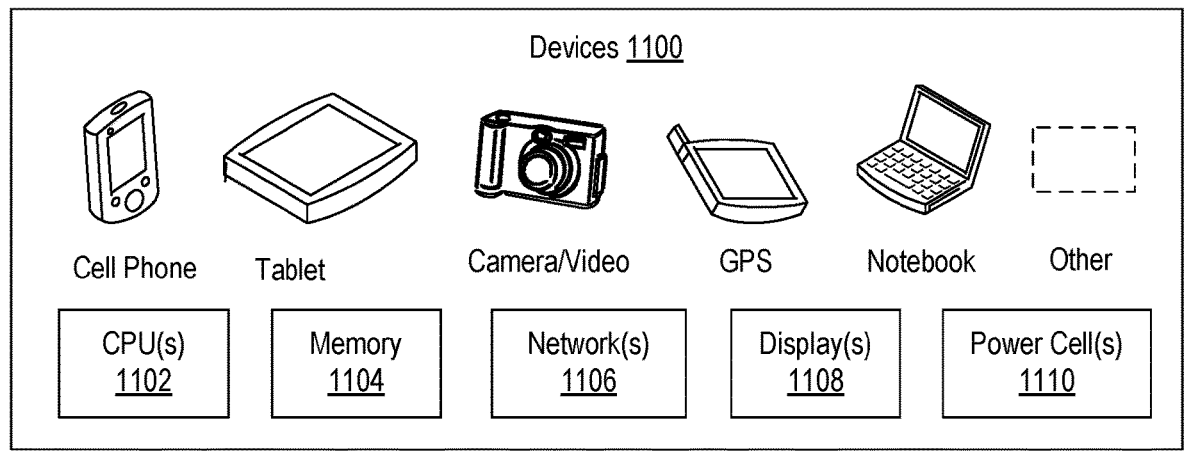
FIG. 11 is a perspective view of an example of a stand with arms and examples of devices.
Figure 11:
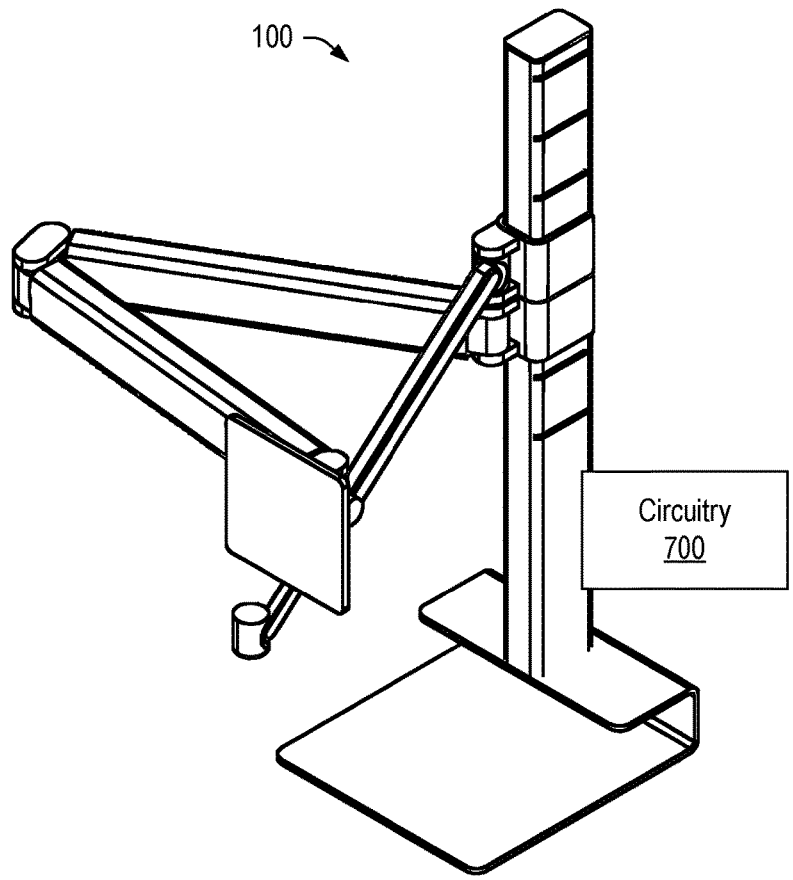

FIG. 11 shows various examples of devices 1100 where one or more of the devices 1100 can include one or more processors 1102, memory 1104, one or more network interfaces 1108, one or more displays 1108 and/or one or more power cells 1110. As an example, a device may be a cell phone (e.g., a smartphone), a tablet, a camera, a GPS device, a notebook computer (e.g., a laptop computer) or another type of device. FIG. 11 shows the system 100 of FIG. 1 along with the circuitry 700, which as mentioned, can include at least hub circuitry. As explained, the circuitry 700 may be or include docking station circuitry such that a device may be operatively coupled to one or more other devices. As an example, the system 100 and/or the kit 1000 may be available with or without the circuitry 700. For example, the circuitry 700 may be an option. As an example, with respect to a GPS device, the system 100 may be mounted to a vehicle (e.g., on, within, etc.) where one or more devices can be appropriately positioned for viewing by an operator or operators. For example, consider a tractor where the tractor includes a backhoe. In such an example, a display device may be positioned using an arm for driving of the tractor and a display device (e.g., the same or another display device) may be positioned for operating the backhoe. In such an example, the tractor may include a swivel seat that allows the operator to move the seating position depending on operation (e.g., driving, backhoe, etc.). In a passenger vehicle, the system 100 may be suitable for use by multiple passengers. For example, consider a driver and a front-seat passenger where the system 100 can accommodate one or more arm mounted devices for one or the other or both. As to a police vehicle, consider a camera in a desirable position, a tablet or laptop in a desirable position and a microphone in a desirable position. In various examples, a mount assembly may be suitable for mounting on an upright facing forward or facing backward. For example, in FIG. 11, consider one arm facing backward and another arm facing forward. In such an example, one arm may be utilized for a camera and the other for a display device where, for example, images captured by the camera can be rendered to a display of the display device (e.g., as may be routed via hub, etc., of the system 100).

As an example, the circuitry 700 may include one or more features of the example devices 1100. For example, consider a "smart" stand that includes computational components such as a processor and memory where the smart stand can include various ports available for connection via cables to one or more devices. For example, consider a smart stand coupled to a display via one arm and a camera via another arm.

As an example, the stand 200 may include vents such that air may rise within one or more passages within the stand 200. In such an example, natural convection may provide for cooling of one or more components within the stand 200. For example, where the stand 200 includes circuitry such as the circuitry 700, as the circuitry 700 generates heat energy, air may be heated and rise via buoyancy forces, which can cause a "suction" effect to draw in air from a vent in a lower portion of the stand. As the stand 200 can include the upright 230 as being oriented in a manner aligned with the acceleration of gravity, the stand 200 can effectively operate as a cooling tower. As an example, features such as openings (e.g., slots, etc.) may be multi-function openings. For example, consider a slot that can function to receive a mount assembly of an arm and that can function as a vent without a mount assembly of an arm. In the example of FIG. 11, unoccupied slots may provide for air flow. As an example, a system may include one or more air movers such as a fan or fans. For example, consider an upright that includes an internal fan that can help cool one or more types of circuitry that may be carried by the upright.

As an example, the stand 200 may include a base level coupling and/or port where, for example, a laptop computer or other computer may be positioned on a tabletop, a desktop, a countertop, etc., where a cable may run to the base level port with minimal clutter. Such an approach may be an option as an alternative to the example laptop holder 514 as shown in FIG. 10 where an overall width of a system may be reduced (e.g., compared to a one or two display and one laptop holder example).

As explained, a system or a kit may provide for a relatively clean and uncluttered arrangement of devices, which may be suitable for tasks such as videoconferencing. Videoconferencing has become more common in view of the pandemic as part of an effort at distancing. However, even before, various cluttered desktop supported setups included multiple displays, a laptop, a webcam, speakers, and a microphone. While a webcam may include a microphone and be mounted to an edge of a display, the display itself was supported on a desktop along with a laptop computer, which may be supported directly on the desktop or on a laptop stand that is supported directly on the desktop. Such setups occupy a substantial amount of desktop space forcing a user to place paper, pens, glasses, etc., in the limited number of vacant spaces on the desktop, overall, adding to substantial clutter.

As to media capture devices, these can have optimal positions, which can be other than that of a desktop. For example, a microphone may be more optimally positioned a level above a desktop. And, as another example, a speaker or speakers may be more optimally positioned at ear level. Further, where devices do not rely on an internal battery and wireless circuitry, cables can be involved. Where a device is on a desktop, its cable will likely also run on the desktop and occupy desktop space. In comparison, the system 100 and/or the kit 1000 can provide for more desktop space while also providing for more optimal positioning of one or more devices and, in various instances, more optimal interactions between devices (e.g., via a hub, etc.).

In the example of FIG. 9, the kit 1000 can include the stand 200 as a single stand for multiple displays 512. Such an approach can be in contrast to a one stand per display approach; noting that a kit may include multiple instances of the stand 200.

In various instances where a user connects devices via a docking station, the docking station is likely to occupy desktop space and present clutter from a variety of cables that run to the docking station and the devices. In contrast, the stand 200 can include internal circuitry that provides docking station functionalities. In such an approach, the stand 200 is multifunctional for structural and electronic functions.

When every device has its own stand, a large portion of the available desktop space is occupied, and the stands and/or stand bases may interfere with each other such that some of the devices cannot be optimally located. For example, to get a webcam in the ideal location might take up desk space that would have been needed to locate a microphone in the ideal place. A user may place a webcam resting on the top edge of a display; however, that limits positioning of the webcam to that top edge (e.g., it can only be moved side to side along the top edge of the display).

Another issue that can add to clutter is unknown cable length. For example, a manufacturer may provide an excessively long cable such that a portion of the cable may be folded over, coiled, etc., in a manner that adds to clutter and/or the occupation of desktop space. As an example, a system and/or a kit may be provided with cables that correspond to arm lengths (e.g., maximum arm lengths) such that clutter is minimized.

As explained, a stand can include multiple mounting points that can be used to attach arms for one or more displays and/or one or more accessories. As an example, a stand can include a clamp to attach to a table or a foot base which rests on a table, and a main column, which may be referred to as an upright. As mentioned, an upright can include mounting points spaced along its height where each can provide for a physical connection for display and/or accessory arms. As explained, an upright can also include ports such as USB ports for electrical connection to a device or devices. As an example, ports may be linked inside the upright via circuitry, for example, forming a hub. In such an example, a device attached to the stand may be able to share power and/or data with one or more other devices, which may be attached to the stand (e.g., via an arm, etc.). In various instances, a system can be setup where the only cable that hangs down behind a desk is a power supply cable running from a wall into a power connector of the stand. As an example, a stand can include circuitry for operation as internal and/or an external AC to DC power supply. As an example, a stand may include one or more rechargeable batteries such that the stand can be itself a source of power.

Referring again to the examples of FIG. 2, FIG. 5 and FIG. 6, when a workspace is to be utilized for multiple tasks and/or multiple people, it may be desirable to move one or more devices out of the way to free up more space. For example, consider pushing all of the devices backward to free up more desktop space (e.g., sufficient for a child to draw with crayons, etc.).

Where a stand includes ports and cables run with arms, as the arms control the position of the cables, risk of tangling of cables is reduced or eliminated. Such an approach can help to address the customary mess of cables that hangs behind most desks, behind displays, etc. Such an approach also makes identifying cables easier such that a user is less likely to unplug the wrong cable.

As an example, a system can include a stand that includes a base and an upright; at least one arm mountable to the upright; and serial transmission port circuitry operatively coupled to a plurality of serial transmission ports disposed along the upright. In such an example, the stand can include a series of axially stacked arm couplings. For example, consider a stand where each of the plurality of serial transmission ports disposed along the upright corresponds to one of the series of axially stacked arm couplings. As mentioned, a coupling may be an opening such as a circle, a slot, etc.

As an example, a system can include at least one arm that is a folding arm and/or can include at least one arm that is a telescoping arm. As shown in the example of FIG. 1 and FIG. 11, a system can include a folding arm and a telescoping arm. As an example, a system may include two folding arms where each of the folding arms includes a display mount. In such an example, consider two displays (e.g., display devices) where one of the displays is mounted to one of the folding arms and where the other of the displays is mounted to the other of the folding arms.

As an example, a system can include a serial transmission cable coupled to one of a plurality of serial transmission ports. In such an example, at least one arm of the system can include a channel that receives at least a portion of the serial transmission cable.

As an example, a system can include serial transmission port circuitry that includes a universal serial bus hub. For example, consider a universal serial bus hub that is disposed at least in part in an upright of the system.

As an example, a system can include at least one arm that is a telescoping arm that includes a serial transmission cable channel. As an example, a system can include at least one arm that is a folding arm that includes a serial transmission cable channel and a power cable channel. As an example, an upright can include a power cable channel where, for example, the power cable channel is or includes an alternating current power cable channel.

As an example, a system can include a stand that includes an upright and a base where the base is a table clamp, for example, suitable for connection to a tabletop, a desktop, a countertop, etc.

As an example, a system can include a stand with a first folding arm coupled to a first display and a second folding arm coupled to a second display. In such an example, the system can include the stand with a telescoping arm coupled to a media capture device and a serial transmission cable coupled to one of a plurality of serial transmission ports of the stand and coupled to the media capture device. In such an example, the media capture device can be disposed below a lower level of the first display and the second display (e.g., consider a media capture device that is or that includes a microphone) or the media capture device can be disposed above an upper level of the first display and the second display (e.g., consider a media capture device that is or that includes a camera).

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
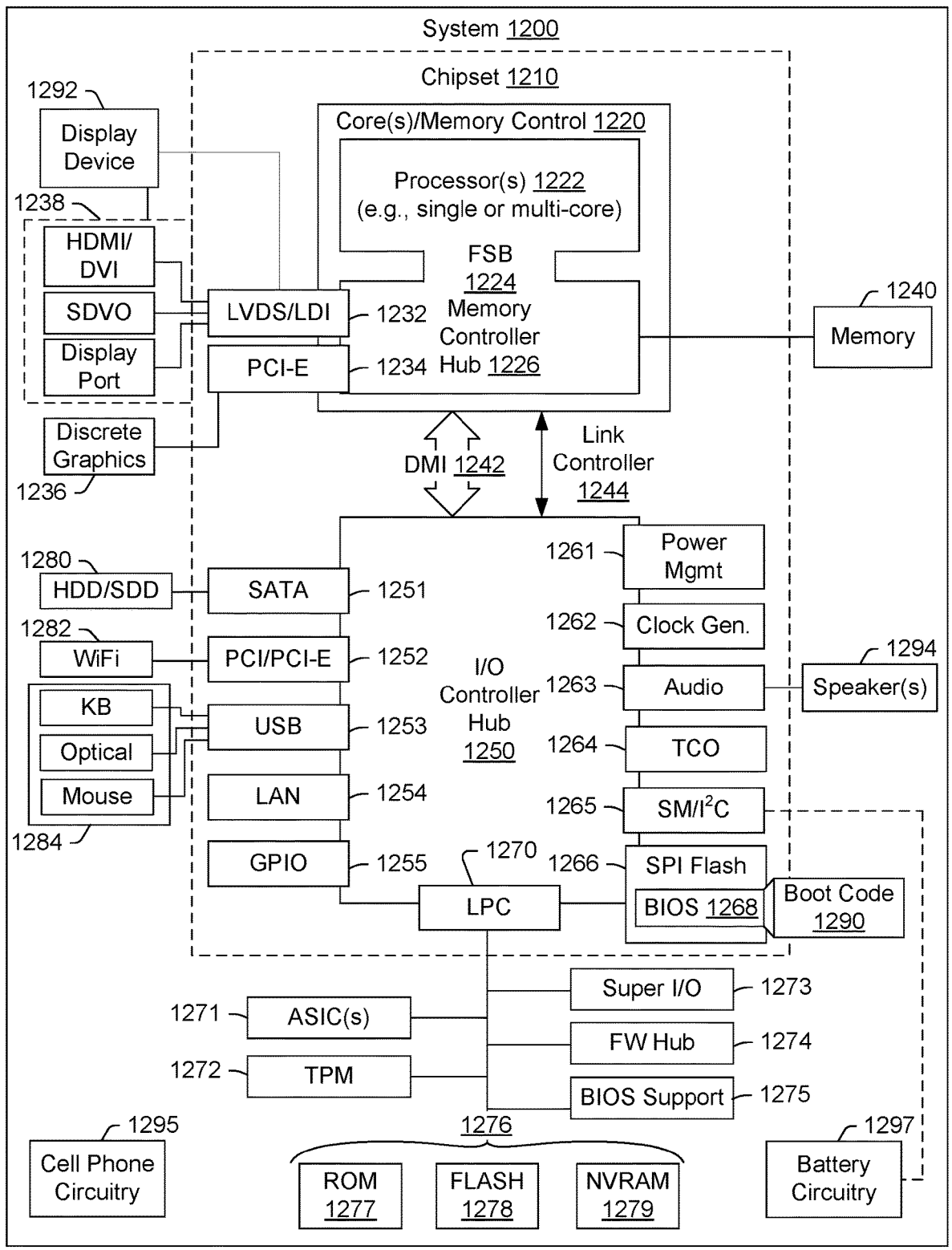
FIG. 12 is a diagram of an example of a system that includes one or more processors.

While various examples of circuits or circuitry have been discussed, FIG. 12 depicts a block diagram of an illustrative computer system 1200. The system 1200 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1200. As an example, a system (e.g., the system 100, the kit 1000, etc.) may include at least some of the features of the system 1200.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, NC). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner. As an example, a system (e.g., the system 100, the kit 1000, etc.) may include at least some of the features of an AIO computing device, which can include at least some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I$^2$C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a stand that comprises a base and an upright, wherein the upright comprises a front side, a back side, a left side, a right side, and a series of axially stacked arm couplings;
    at least two arms mountable to the upright, wherein the at least two arms comprise at least a computing device mounting arm and a peripheral device mounting arm, and wherein each of the mounting arms comprises a mount assembly that comprises a front side arm joint and a mounting feature that cooperates with a respective one of the series of axially stacked arm couplings of the upright;
    a serial transmission port hub carried by the stand and operatively coupled to a series of serial transmission ports spaced along the upright in a one-to-one correspondence with the series of axially stacked arm couplings of the upright; and
    a power cable coupled to the stand that supplies electrical power to the serial transmission port hub, wherein two of the series of serial transmission ports supply power to and communicatively couple a computing device mounted to the computing device mounting arm and a peripheral device mounted to the peripheral device mounting arm.

2. The system of claim 1, wherein the at least two arms comprise at least a folding arm.

3. The system of claim 1, wherein the at least two arms comprise at least a telescoping arm.

4. The system of claim 1, wherein the at least two arms comprise at least a folding arm and at least a telescoping arm.

5. The system of claim 1, wherein the at least two arms comprise two folding arms, wherein each of the folding arms comprises a display mount.

6. The system of claim 1, comprising a first serial transmission cable coupled to one of the two of the series of serial transmission ports and a second serial transmission cable coupled to another one of the two of the series of serial transmission ports.

7. The system of claim 6, wherein the computing device mounting arm comprises a channel that receives at least a portion of the first serial transmission cable and wherein the peripheral device mounting arm comprises a channel that receives at least a portion of the second serial transmission cable.

8. The system of claim 1, wherein the serial transmission port hub is a universal serial bus hub that is disposed at least in part in the upright.

9. The system of claim 1, wherein the at least two arms comprise at least a telescoping arm that comprises a serial transmission cable channel.

10. The system of claim 1, wherein the at least two arms comprise a at least folding arm that comprises a serial transmission cable channel and a power cable channel.

11. The system of claim 1, wherein the upright comprises a power cable channel that receives at least a portion of the power cable.

12. The system of claim 11, wherein the power cable channel comprises an alternating current power cable channel and further comprising AC to DC conversion circuitry, coupled to the power cable and disposed in the upright, that directly, indirectly or directly and indirectly supplies DC power to the serial transmission port hub.

13. The system of claim 1, wherein the base comprises a table clamp and wherein the stand comprises one or more rechargeable batteries.

14. The system of claim 1, wherein the at least two arms comprise a first folding arm coupled to a first display as the peripheral device and a second folding arm coupled to a second display as another peripheral device.

15. The system of claim 14, wherein the at least two arms comprise a telescoping arm coupled to a media capture device and comprising a serial transmission cable coupled to one of the series of serial transmission ports and the media capture device.

16. The system of claim 15, wherein the media capture device is disposed below a lower level of the first display and the second display.

17. The system of claim 15, wherein the media capture device is disposed above an upper level of the first display and the second display.

18. The system of claim 1, comprising an uninterruptible power supply disposed at least in part in the upright, wherein the uninterruptible power supply comprises at least one battery operable to supply power to the serial transmission port hub.

19. The system of claim 1, wherein the mount assembly comprises a port opening alignable with a corresponding one of the series of serial transmission ports.

* * * * *